United States Patent
Wise et al.

(10) Patent No.: US 8,796,980 B2
(45) Date of Patent: Aug. 5, 2014

(54) FAULT DETECTION SYSTEM AND METHOD FOR OVERSPEED PROTECTION SPEED SENSORS

(71) Applicant: General Electric Company, Schenectady, NY (US)

(72) Inventors: Michael Glynn Wise, Roanoke, VA (US); Fred Henry Boettner, Roanoke, VA (US); John Robert Booth, Hardy, VA (US)

(73) Assignee: General Electric Company, Schenectady, NY (US)

(*) Notice: Subject to any disclaimer, the term of this patent is extended or adjusted under 35 U.S.C. 154(b) by 130 days.

(21) Appl. No.: 13/656,042

(22) Filed: Oct. 19, 2012

(65) Prior Publication Data

US 2014/0111888 A1    Apr. 24, 2014

(51) Int. Cl.
*G05B 11/36* (2006.01)
*G05B 5/01* (2006.01)

(52) U.S. Cl.
CPC ........................................ *G05B 5/01* (2013.01)
USPC .................. 318/609; 318/400.38; 318/400.12

(58) Field of Classification Search
CPC .................. G05B 5/01; G05B 11/42

USPC ................................ 318/609, 400.38, 400.12
See application file for complete search history.

(56) References Cited

U.S. PATENT DOCUMENTS

| | | | | |
|---|---|---|---|---|
| 4,258,299 A | * | 3/1981 | Takeda et al. | 318/258 |
| 4,667,114 A | * | 5/1987 | Rossi | 290/40 A |
| 7,293,761 B2 | * | 11/2007 | Malek et al. | 254/275 |
| 7,378,815 B2 | * | 5/2008 | Losch et al. | 318/724 |
| 7,446,498 B2 | | 11/2008 | Cheng et al. | |
| 7,549,513 B2 | | 6/2009 | Chida | |
| 2008/0213084 A1 | | 9/2008 | Rosenfield et al. | |

* cited by examiner

*Primary Examiner* — David Luo
(74) *Attorney, Agent, or Firm* — Cantor Colburn LLP

(57) ABSTRACT

A fault detection system for an over-speed protection system of a rotating machine includes a first speed sensor, second speed sensor, and third speed sensor sensing a speed of a shaft of the rotating machine. The system includes a first input configured to receive a first pulse train from the first speed sensor, a second input configured to receive a second pulse train from the second speed sensor, a third input configured to receive a third pulse train from the third speed sensor, and a processor configured to generate a shutdown signal for the rotating machine based on the first pulse train, the second pulse train, and the third pulse train.

17 Claims, 4 Drawing Sheets

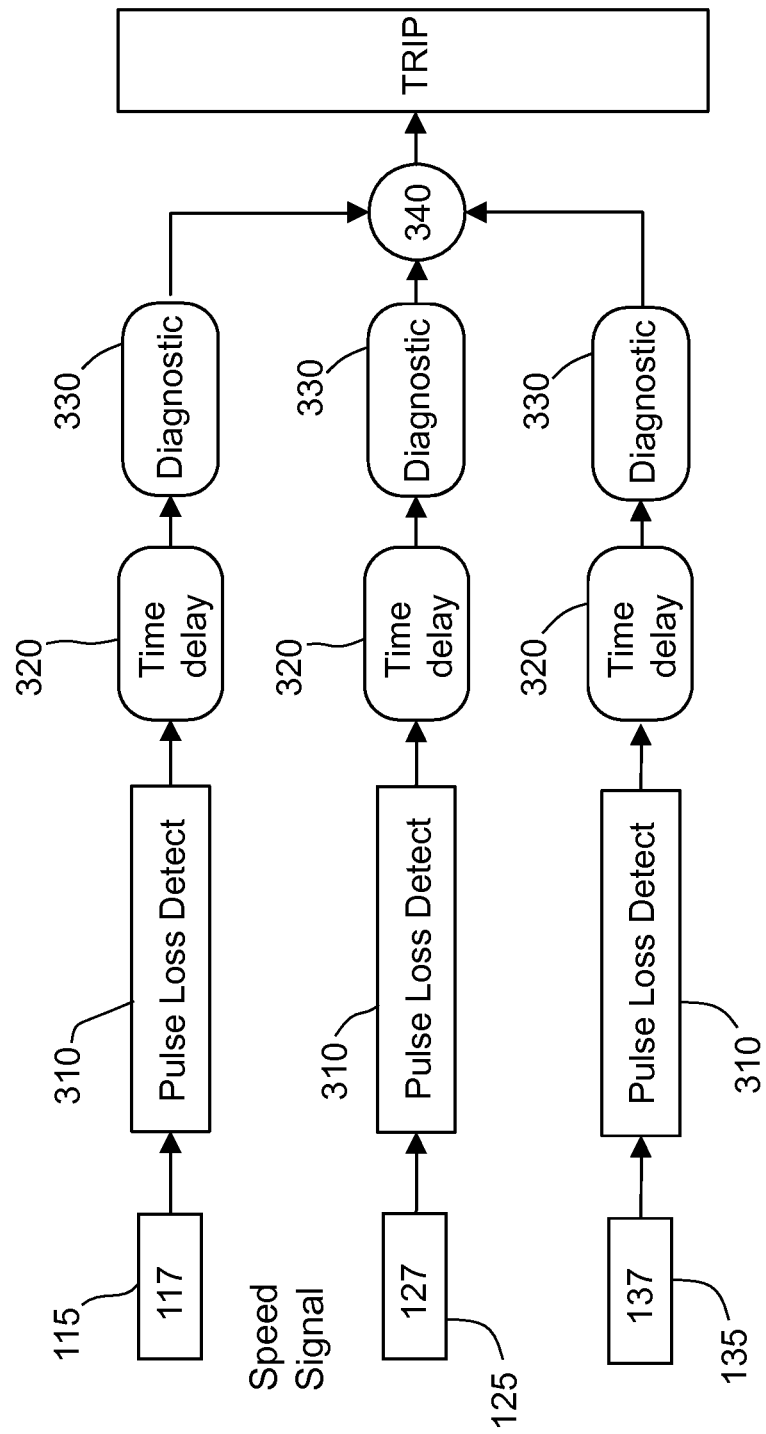

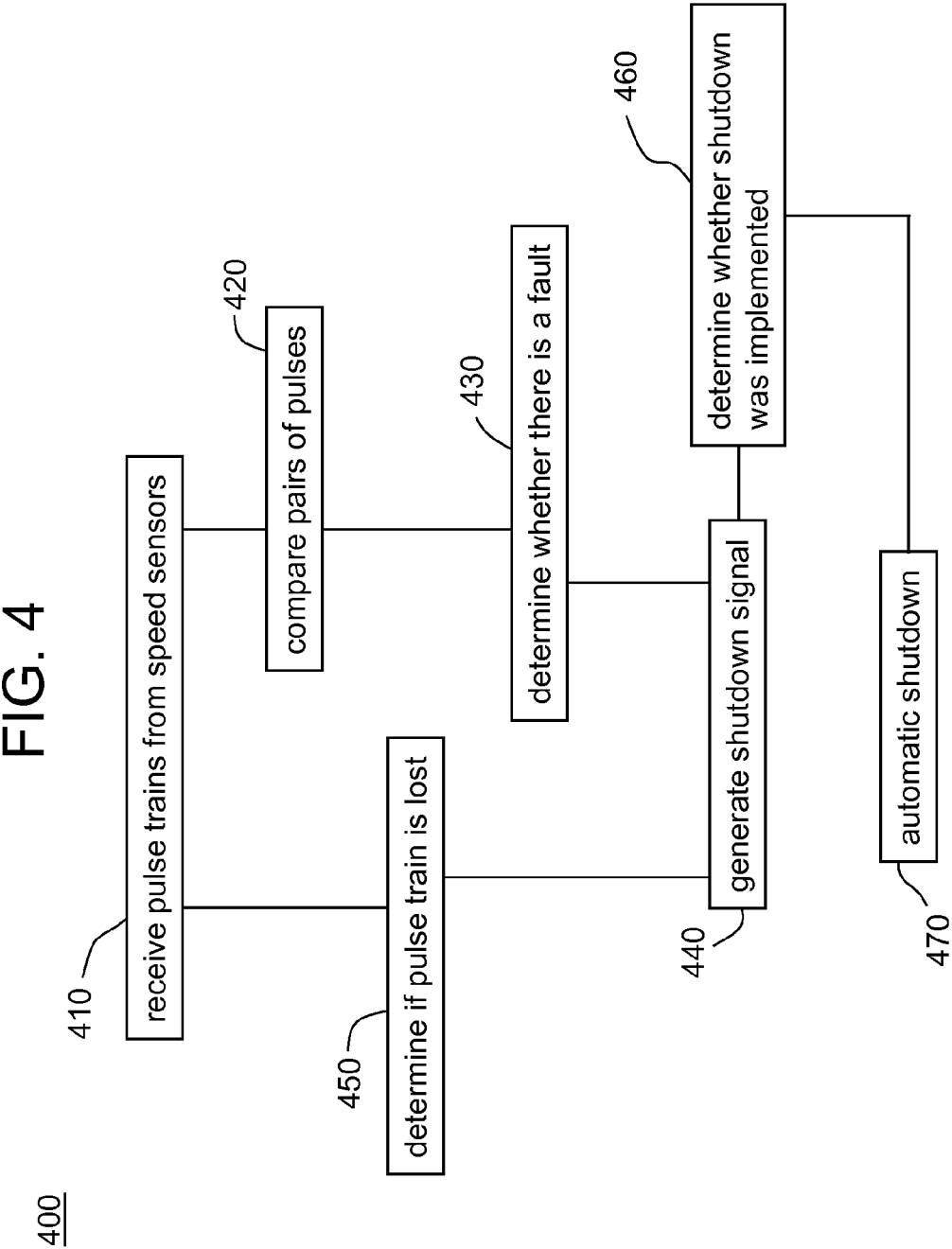

FAULT DETECTION SYSTEM AND METHOD FOR OVERSPEED PROTECTION SPEED SENSORS

BACKGROUND OF THE INVENTION

The subject matter disclosed herein relates to control of a rotating machine and, more particularly, to over speed protection.

In rotating machinery, such as a turbomachine or series wound DC motor, for example, an over-speed condition represents one of the primary hazard modes and can result in catastrophic failure with moving parts being liberated from the shaft. As a result, rotating machines, typically include over-speed protection systems that mitigate damage from over-speed conditions by imposing a shutdown (tripping the system). However, the integrity of the over-speed protection system itself, and specifically the speed sensors used to implement the over-speed protection, is critical to reducing false alarms that impact efficiency and improving protection of the rotating machine in case of a real over-speed condition. Thus, a more reliable fault detection system and method for over-speed protection speed sensors would be appreciated in the power industry.

BRIEF DESCRIPTION OF THE INVENTION

According to one aspect of the invention, a fault detection system for an over-speed protection system of a rotating machine including a first speed sensor, second speed sensor, and third speed sensor sensing a speed of a shaft of the rotating machine includes a first input configured to receive a first pulse train from the first speed sensor; a second input configured to receive a second pulse train from the second speed sensor; a third input configured to receive a third pulse train from the third speed sensor; and a processor configured to generate a shutdown signal for the rotating machine based on the first pulse train, the second pulse train, and the third pulse train.

According to another aspect of the invention, a programmable logic device programmed to perform fault detection of an over-speed protection system for a rotating machine including a first speed sensor, second speed sensor, and third speed sensor sensing a speed of a shaft of the rotating machine includes a first input configured to receive a first pulse train from the first speed sensor; a second input configured to receive a second pulse train from the second speed sensor; a third input configured to receive a third pulse train from the third speed sensor; and a processor configured to generate a shutdown signal for the rotating machine based on the first pulse train, the second pulse train, and the third pulse train.

According to yet another aspect of the invention, a method, implemented by a processor, of detecting faults in an over-speed protection system of a rotating machine includes determining whether a first pulse train is received from a first speed sensor sensing a first speed of a shaft of the rotating machine; determining whether a second pulse train is received from a second speed sensor sensing a second speed of the shaft; determining whether a third pulse train is received from a third speed sensor sensing a third speed of the shaft; and when a specified number of the first pulse train, the second pulse train, and the third pulse train are determined to not be received, outputting a shutdown signal based on processing the first pulse train, the second pulse train, and the third pulse train.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a logic diagram of other aspects of the processor of FIG. 1 according to an embodiment of the invention; and FIG. 4 illustrates the processes involved in fault detection of the over-speed protection speed sensors.

The detailed description explains embodiments of the invention, together with advantages and features, by way of example with reference to the drawings.

DETAILED DESCRIPTION OF THE INVENTION

Figure 1:
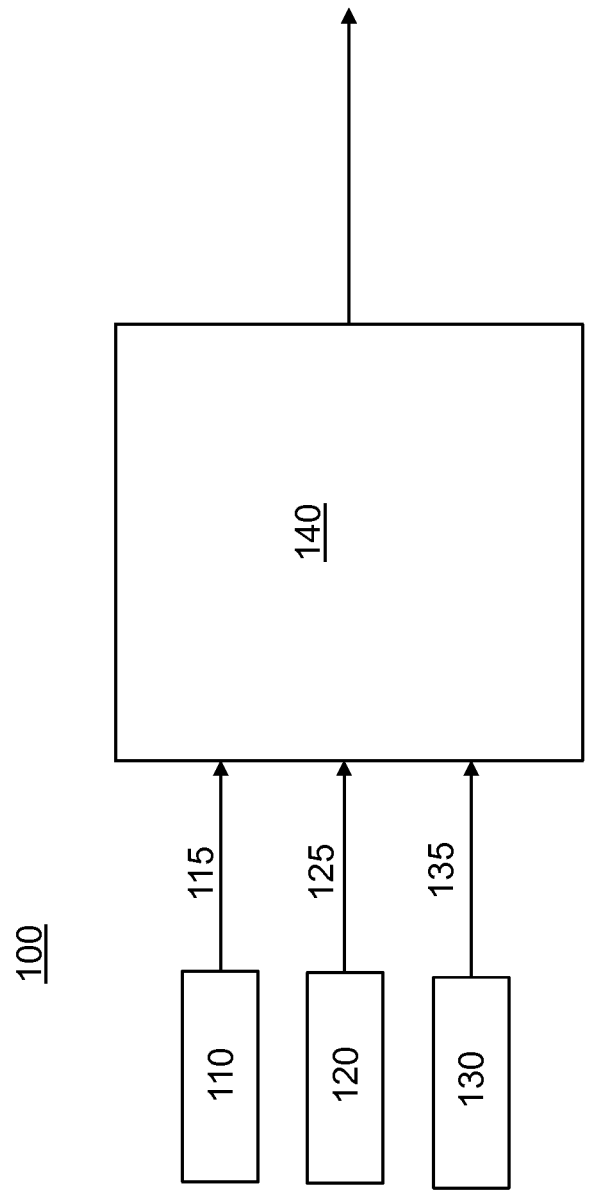
FIG. 1 is a block diagram of a fault detection system 100 for over-speed protection speed sensors according to an embodiment of the invention.

FIG. 1 is a block diagram of a fault detection system 100 for over-speed protection system speed sensors 110, 120, 130 according to an embodiment of the invention. The system 100 includes three speed sensors 110, 120, 130 positioned on a shaft (not shown) of a rotating machine such as a turbomachine. In one embodiment, each speed sensor 110, 120, 130 outputs a pulse 115, 125, 135 each time a toothed wheel associated with the shaft passes under the corresponding speed sensor 110, 120, 130. Thus, the number of pulses 115, 125, 135 output by each speed sensor 110, 120, 130 over a given duration corresponds with the speed of the shaft. In alternate embodiments, other methods that translate rotational velocity to pulse rate may be used and may employ any device that creates an electrical signal with a frequency proportional to a rate of rotation. These other methods may include optical speed encoders and resolvers connected to pulse generation circuits. The methods may also employ a passive magnetic speed sensor that creates a sine wave output transformed into pulses by a wave shaping network. The pulses (pulse train) 115, 125, 135 output from the three speed sensors 110, 120, 130 are input to a processor 140. In the embodiment detailed with reference to FIGS. 2 and 3, the processor 140 is a Field Programmable Gate Array (FPGA). In alternate embodiments, other programmable logic devices (e.g., Complex Programmable Logic Device (CPLD), Application Specific Integrated Circuit ASIC) and processor configurations (e.g., microprocessor devices) are also contemplated. The programmable logic devices or other implementations of the processor 140 have the technical effect of performing fault detection for the over-speed protection system speed sensors 110, 120, 130.

Figure 2:
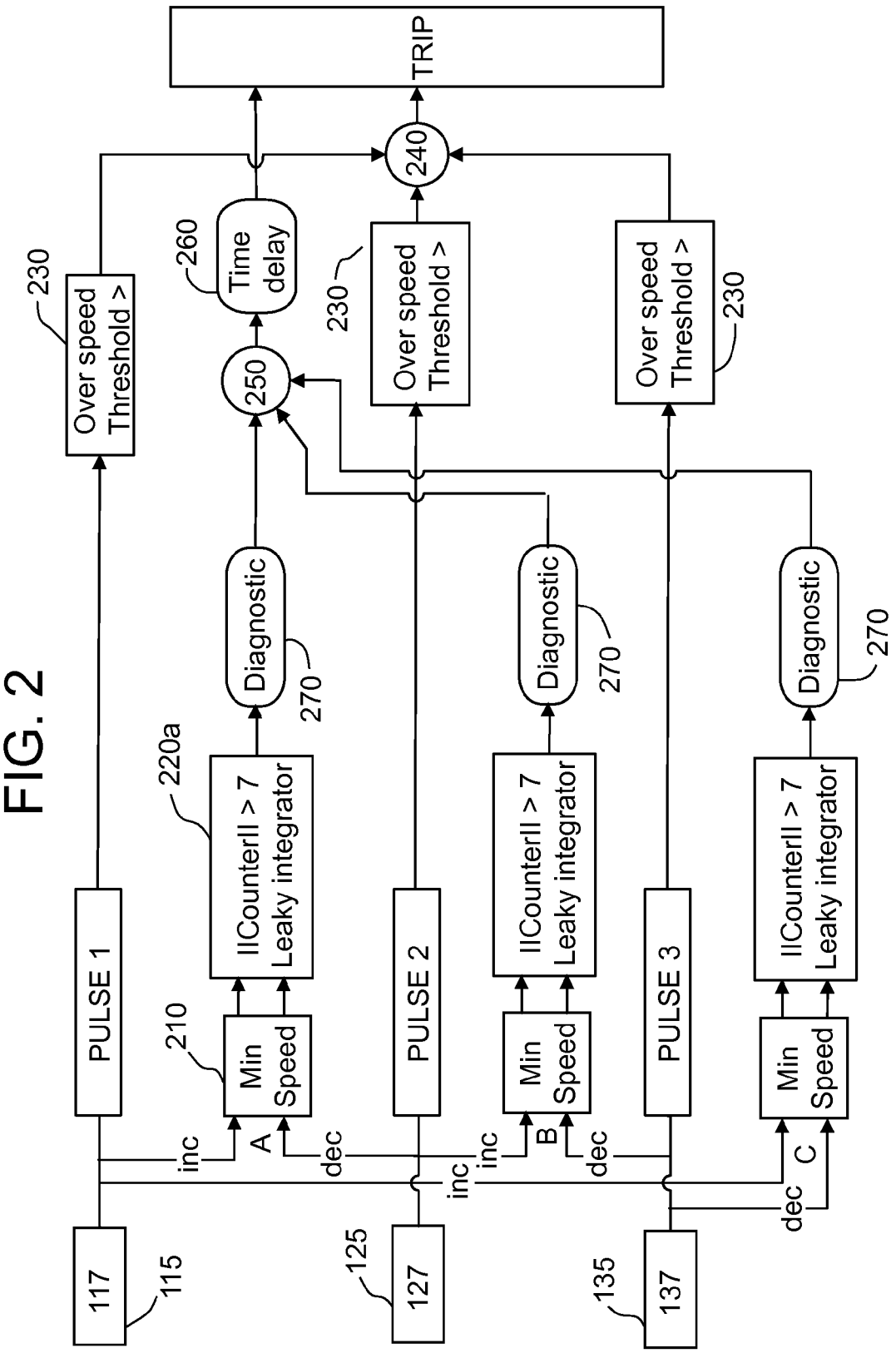
FIG. 2 is a logic diagram of aspects of a processor of FIG. 1 according to an embodiment of the invention.

FIG. 2 is a logic diagram of aspects of a processor 140 of FIG. 1 according to an embodiment of the invention. The exemplary FPGA processor 140 includes inputs 117, 127, 137 that receive pulses 115, 125, 135, respectively, from each of the three speed sensors 110, 120, 130. The pulses 115, 125, 135 from each of the speed sensors 110, 120, 130 is used to determine if the detected speed of the shaft exceeds a specified (over-speed) threshold at the block 230. Ideally, because all three speed sensors 110, 120, 130 are disposed on the same shaft, the outputs of all of the speed sensors 110, 120, 130 should be the same such that the outputs of all three speed sensors 110, 120, 130 should indicate a speed exceeding the over-speed threshold at blocks 230 at the same time. However, if one or more of the speed sensors 110, 120, 130 is faulty, the over-speed protection is compromised. The logic used by the processor 140 to perform fault detection of the speed sensors 110, 120, 130 and to maintain the integrity of the over-speed protection is detailed below.

Each of the speed sensors 110, 120, 130 is paired with each of the other two speed sensors 110, 120, 130. As shown, the pulses 115, 125 of speed sensors 110, 120 are paired at A, the pulses 125, 135 of speed sensors 120, 130 are paired at B, and the pulses 115, 135 of speed sensors 110, 130 are paired at C. For each pair A, B, C a counter which acts as an error integrator 220 increments by one for each pulse 115, 125, 135 from one of the pair A, B, C and decrements by one for each pulse 115, 125, 135 from the other of the pair A, B, C. That is, the error integrator 220a will increment the count for each pulse 115 from speed sensor 110 and decrement the count for each pulse 125 from speed sensor 120, while the error integrator 220b will increment the count for each pulse 125 from the speed sensor 120 and decrement the count for each pulse 135 from the speed sensor 130, and the error integrator 220c will increment the count for each pulse 115 from the speed sensor 110 and decrement the count for each pulse 135 from the speed sensor 130. As noted above, ideally, because all the speed sensors 110, 120, 130 are disposed on the same shaft, every speed sensor 110, 120, 130 should generate a pulse 115, 125, 135 at the same time. Thus, each error integrator 220 should maintain a count of zero because, as one of the two speed sensors 110, 120, 130 associated with each error integrator 220 causes an increment in the count, the other of the two speed sensors 110, 120, 130 associated with each error integrator 220 causes a decrement of the count.

However, spurious pulses accumulated over a long period of time could be detected and integrated into each error integrator 220. To compensate for this accumulation, each error integrator 220 decrements, by one count at a time towards zero, over a period of time. Thus, each error integrator 220 acts as a leaky integrator. In addition, because variations in sensitivity of the different speed sensors 110, 120, 130 at low speeds can cause spurious shutdown (spurious detection of a fault), a minimum speed detector 210 is used to ensure that a minimum speed is achieved before the processor 140 begins the fault detection process. The minimum speed is a threshold value that is set and adjusted, as needed, based on various factors including sensor capabilities. Fault detection is initiated when any one of the minimum speed detectors 210 detects a shaft speed exceeding the set threshold and is stopped when all three of the minimum speed detectors 210 detect a shaft speed below the threshold. The minimum speed threshold may be set based on modeled or experimental results. The minimum speed threshold may be zero in some cases to ensure continuous operation of the fault detection. In other embodiments, the minimum speed may be set to a specific value (e.g., half the over-speed threshold value set at block 230).

Detection of a faulty speed sensor 110, 120, 130 is indicated by a significant pulse count difference in an error integrator 220. When any error integrator 220 detects a faulty speed sensor 110, 120, 130 (i.e., a significant difference in pulses being counted for the pair of speed sensors 110, 120, 130 input to it), that error integrator 220 votes for a shutdown of the rotating machine. By having three pairings of speed sensors 110, 120, 130 into three error integrators 220, over-speed protection integrity is enhanced in the following way.

When a single speed sensor 110, 120, 130 is faulty, then two of the error integrators 220 will detect a fault and vote for a shutdown based on a mismatch of pulse counts. For example, if the speed sensor 120 is faulty, then the error integrator 220a (comparing pulses 115, 125 from speed sensors 110, 120) and 220b (comparing pulses 125, 135 from speed sensors 120, 130) will both detect significant pulse count differences and, thus, will vote for shutdown. In this case of two-out-of-three of the error integrators 220 detecting a fault (at block 240), the fault detection system 100 does not shut down the rotating machine because two of the speed sensors (110, 130 in the exemplary case) are functioning properly and have pulses 115, 135 that agree in pulse count at error integrator 220c. However, when at least two speed sensors 110, 120, 130 are faulty, then all three error integrators 220 detect pulse count differences. For example, if both the speed sensors 110, 120 are faulty, then the error integrator 220a (comparing pulses 115, 125 from speed sensors 110, 120), the error integrator 220b (comparing pulses 125, 135 from speed sensors 120, 130), and the error integrator 220c (comparing pulses 115, 135 from speed sensors 110, 130) will all detect significant pulse count differences and will all vote for a shutdown. In this case of three-out-of-three (block 250) of the error integrators 220 detecting a fault, the fault detection system 100 does shut down the rotating machine because, with at least two of the three speed sensors 110, 120, 130 exhibiting faults, the integrity of the over-speed protection system is compromised. When the three-out-of-three condition at block 250 is reached, a time delay (block 260) is first implemented prior to shutdown of the rotating machine. This time delay (FIG. 2, block 260) allows an operator to do a machine shutdown prior to an automated trip. Additionally, each instance of a fault detection (significant pulse count difference) at a given error integrator 220 is followed by a diagnostic process (at block 270) before the shutdown vote by the error integrator 220 is processed. The diagnostic process (block 270) includes a repair that may eliminate the fault. In an alternate embodiment of a more sensitive fault detection system 100, the blocks 240 and 250 may represent one-out-of-three and two-out-of-three conditions, respectively. That is, while only one of the three error integrators 220 indicating a fault (at block 240) would not lead to shutdown, two of the three error integrators 220 indicating a fault (at block 250) would lead to shutdown of the rotating machine in this more sensitive case. This exemplary embodiment illustrates that the logic implemented by the processor 140 allows flexibility in the level of sensitivity.

FIG. 3 is a logic diagram of other aspects of the processor 140 of FIG. 1 according to an embodiment of the invention. The detection of pulse count differences was discussed with reference to FIG. 2. Another possible issue for a given speed sensor 110, 120, 130, in addition to a mis-count, is a loss of pulse count. The loss of pulse inputs to an error integrator 220 appears as a sudden decrease in pulse inputs over the short term. The rapid decrease in pulse inputs, faster than expected for a decelerating shaft, indicates a loss of signal from a speed sensor 110, 120, 130 or a failure of a speed sensor 110, 120, 130 at block 310. A time delay (block 320) ensures that the loss of pulses is a permanent condition due to a failure of a speed sensor 110, 120, 130 rather than a transient condition. If the loss of pulses results from transient dropped pulses (i.e., pulses 115, 125, 135 are all detected after the time delay at 320), the logic of FIG. 2 would still apply to the fault detection system 100. As noted with reference to FIG. 2, one faulty speed sensor 110, 120, 130 that results in a loss of one set of pulses 115, 125, 135 can be tolerated by the system 100 and would result in a two-out-of-three condition (FIG. 2, block 240). However, if two of the three speed sensors 110, 120, 130 experiences a loss of pulse output, then this presents a special fault that would not be detected by the logic at FIG. 2, because the two faulty speed sensors 110, 120, 130 would agree in their outputs. This agreement in the output of two faulty speed sensors 110, 120, 130 is highly unlikely when two speed sensors 110, 120, 130 are miscounting but is certain when both faulty speed sensors 110, 120, 130 are not outputting pulses 115, 125, 135 at all. That is, for example, if both speed sensors 110 and 130 stopped outputting pulses 115 and 135, then (at FIG. 2) error integrators 220a and 220b would detect significant differences in pulse count, respectively between pulses 115, 125 of speed sensors 110, 120 and pulses 115, 135 of speed sensors 110, 130. However, even though two speed sensors (110 and 130 in the example) are not outputting pulses (115 and 135 in the example) at all, error integrator 220c would not detect a difference in pulse count because both input pulse counts would be zero (and thereby agree). As a result, in this special case of dropped pulses (115 and 135 in the example) due to two faulty speed sensors (110 and 130 in the example), only the two-out-of-three (at block 240 in the example above) rather than the three-out-of-three (at block 250 in the example above) condition would have been reached by the logic shown at FIG. 2 in order to generate a shutdown signal. As shown at FIG. 3, to deal with this special case, the two-out-of-three criteria (at block 330) is sufficient to trip the system (shut down the rotating machine). As noted above during the discussion of FIG. 2, the logic implemented by the processor 140 is robust such that, for example, a one-out-of-three criteria (at block 330) may be sufficient to trip the system in alternate embodiments. A detection of dropped pulses is followed by a diagnostic (block 330) before reaching the shut down condition (block 340). The diagnostic (block 330) allows a repair that may restart pulse output.

FIG. 4 illustrates the processes 400 involved in fault detection of the over-speed protection. The processes 400 include receiving pulse trains 115, 125, 135 from each of the speed sensors 110, 120, 130 at 410. At block 420, the pairs of pulses 115, 125, 135 are compared at each of the error integrators 220. The processes 400 include, at block 430, determining whether or not a fault has occurred in one or more of the speed sensors 110, 120, 130 based on the comparison at block 420. When all three error integrators 220 indicate a fault (three-out-of-three condition at block 250 is reached), then the processes 400 include generating a shutdown signal at block 440. When pulses 115, 125, 135 are not detected from one or more speed sensors 110, 120, 130 at block 410, then a determination is made as to whether a permanent loss of pulses 115, 125, 135 has occurred due to a faulty speed sensor 110, 120, 130. When it is determined, at block 450, that at least two of the speed sensors 110, 120, 130 have stopped outputting pulses 115, 125, 135 (two-out-of-three condition at block 330 is reached), then the processes 400 proceed to generating a shutdown signal at block 440. Once a shutdown signal has been generated at block 440, a time delay is implemented to allow an operator to shut down the rotating machine. If, at block 460, it is determined that an operator has not implemented a shutdown after the time delay, an automatic shutdown of the rotating machine is implemented at block 470.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fault detection system for an over-speed protection system of a rotating machine including a first speed sensor, second speed sensor, and third speed sensor sensing a speed of a shaft of the rotating machine, the system comprising:
a first input configured to receive a first pulse train from the first speed sensor;
a second input configured to receive a second pulse train from the second speed sensor;
a third input configured to receive a third pulse train from the third speed sensor; and
a processor configured to generate a shutdown signal for the rotating machine based on the first pulse train, the second pulse train, and the third pulse train;
a first error integrator configured to process the first pulse train and the second pulse train and output a first fault signal;
a second error integrator configured to process the first pulse train and the third pulse train and output a second fault signal; and
a third error integrator configured to process the second pulse train and the third pulse train and output a third fault signal, wherein
the processor generates the shutdown signal for the rotating machine based on the first fault signal, the second fault signal, and the third fault signal.

2. The system according to claim 1, wherein the first error integrator outputs the first fault signal based on a difference in pulse count between the first pulse train and the second pulse train, the second error integrator outputs the second fault signal based on a difference in pulse count between the first pulse train and the third pulse train, and the third error integrator outputs the third fault signal based on a difference in pulse count between the second pulse train and the third pulse train.

3. The system according to claim 2, wherein the processor generates the shutdown signal when two of the first fault signal, the second fault signal, and the third fault signal are output.

4. The system according to claim 2, wherein the processor generates the shutdown signal when all of the first fault signal, the second fault signal, and the third fault signal are output.

5. The system according to claim 1, wherein the processor generates the shutdown signal when at least one among the first pulse train, the second pulse train, and the third pulse train are not received.

6. The system according to claim 1, wherein the processor generates the shutdown signal when at least two among the first pulse train, the second pulse train, and the third pulse train are not received.

7. The system according to claim 1, wherein the processor implements an automatic shutdown of the rotating machine after a time delay following generation of the shutdown signal.

8. A programmable logic device programmed to perform fault detection of an over-speed protection system for a rotating machine including a first speed sensor, second speed sensor, and third speed sensor sensing a speed of a shaft of the rotating machine, the device comprising:
a first input configured to receive a first pulse train from the first speed sensor;

a second input configured to receive a second pulse train from the second speed sensor;
a third input configured to receive a third pulse train from the third speed sensor; and
a processor configured to generate a shutdown signal for the rotating machine based on the first pulse train, the second pulse train, and the third pulse train;
a first error integrator configured to process the first pulse train and the second pulse train and output a first fault signal;
a second error integrator configured to process the first pulse train and the third pulse train and output a second fault signal; and
a third error integrator configured to process the second pulse train and the third pulse train and output a third fault signal, wherein
the processor generates the shutdown signal for the rotating machine based on the first fault signal, the second fault signal, and the third fault signal.

9. The device according to claim 8, wherein the first error integrator outputs the first fault signal based on a difference in pulse count between the first pulse train and the second pulse train, the second error integrator outputs the second fault signal based on a difference in pulse count between the first pulse train and the third pulse train, and the third error integrator outputs the third fault signal based on a difference in pulse count between the second pulse train and the third pulse train.

10. The device according to claim 9, wherein the processor generates the shutdown signal when two of the first fault signal, the second fault signal, and the third fault signal are output.

11. The device according to claim 9, wherein the processor generates the shutdown signal when all of the first fault signal, the second fault signal, and the third fault signal are output.

12. The device according to claim 8, wherein the processor generates the shutdown signal when at least one among the first pulse train, the second pulse train, and the third pulse train are not received.

13. The device according to claim 8, wherein the processor generates the shutdown signal when at least two among the first pulse train, the second pulse train, and the third pulse train are not received.

14. The device according to claim 8, wherein the processor implements an automatic shutdown of the rotating machine after a time delay following generation of the shutdown signal.

15. A method, implemented by a processor, of detecting faults in an over-speed protection system of a rotating machine, the method comprising:
determining whether a first pulse train is received from a first speed sensor sensing a first speed of a shaft of the rotating machine;
determining whether a second pulse train is received from a second speed sensor sensing a second speed of the shaft;
determining whether a third pulse train is received from a third speed sensor sensing a third speed of the shaft; and
when a specified number of the first pulse train, the second pulse train, and the third pulse train are determined to not be received, outputting a shutdown signal based on processing the first pulse train, the second pulse train, and the third pulse train, wherein the processing the first pulse train, the second pulse train, and the third pulse train includes comparing a number of pulses in the first pulse train with a number of pulses in the second pulse train in a first comparison and with a number of pulses in the third pulse train in a second comparison and comparing the number of pulses in the second pulse train with the number of pulses in the third pulse train in a third comparison.

16. The method according to claim 15, wherein the specified number is two.

17. The method according to claim 15, wherein the specified number is one.

* * * * *